United States Patent Office 3,166,014
Patented Jan. 19, 1965

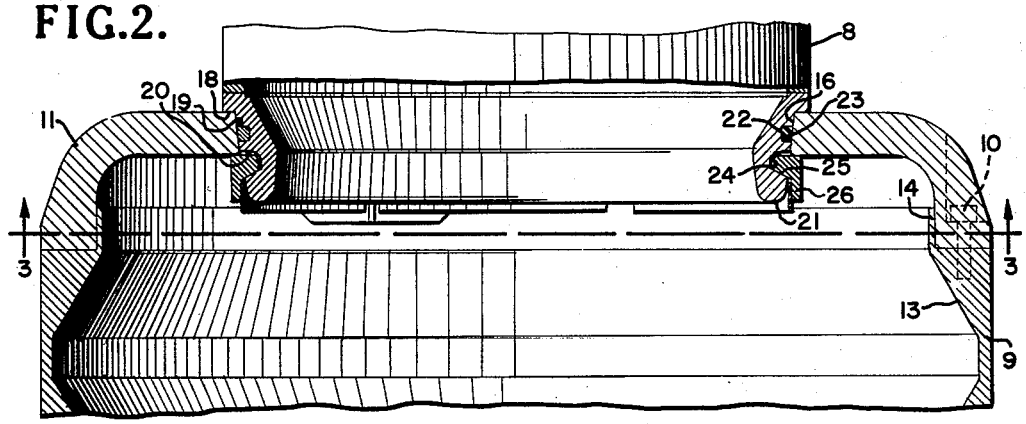
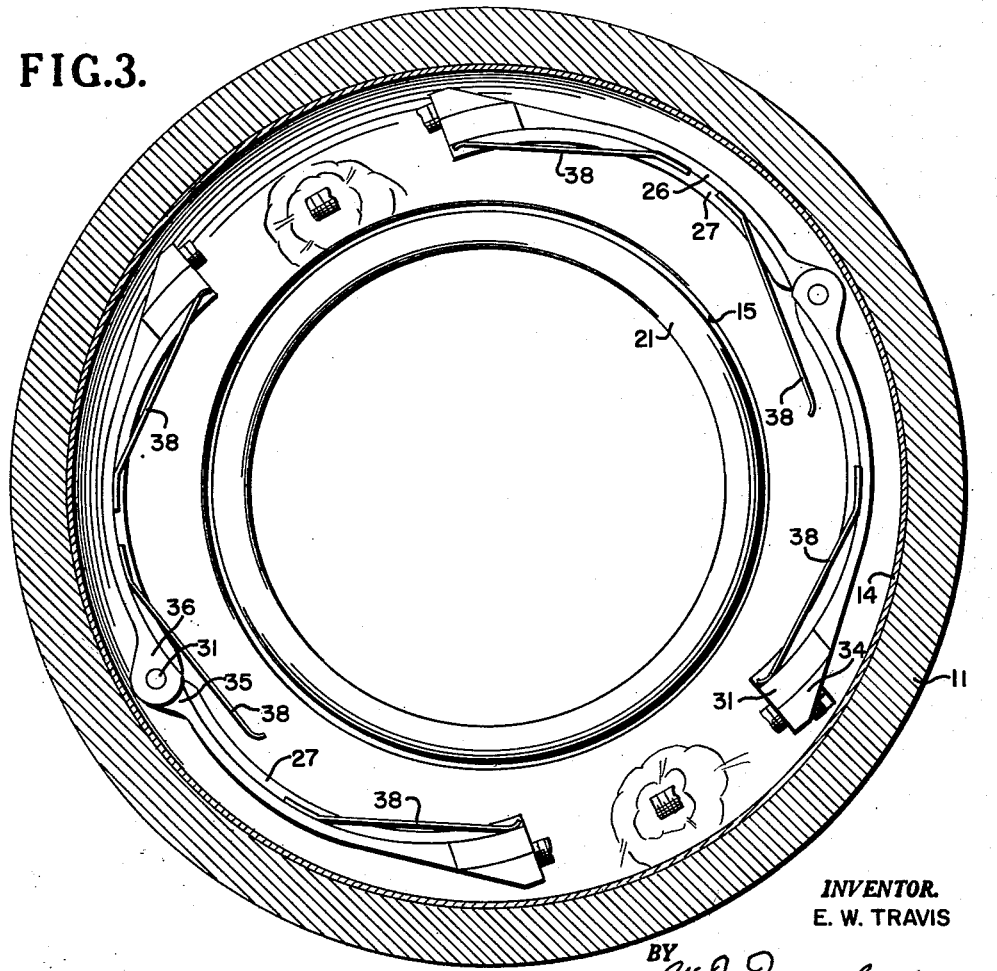

3,166,014
SEPARATION MECHANISM
Elmer W. Travis, Clarksville, Md., assignor to the United States of America as represented by the Secretary of the Navy
Filed Dec. 27, 1960, Serial No. 78,792
3 Claims. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

The present invention relates to a quickly detachable clamp to ordinarily hold the bird section of a missile in sealing relationship with the motor section of the missile.

In order for a missile flight to be successful, it is necessary at some predetermined moment to detach the bird section from the motor section, the bird section continuing along its path by momentum, which is calculated as sufficient to carry the bird to the target. This separation of the bird section and the motor section must be accomplished in a very short space of time and the bird must be completely released simultaneously throughout the 360° of contact with the motor section to prevent deviation of the bird section from its course. The connecting means must be capable of clamping the bird section to the motor section in sealing relationship and must release the two sections within a few micro-seconds, simultaneously throughout their entire 360° of contact. The clamp must be carried internally of the missile and there must be sufficient space to house the discarded clamp so as not to interfere with the bird section at the time of release.

An object of this invention is to provide a clamp which will hold the bird section of a missile in tight sealing relationship with the motor section of the missile throughout substantially 360° of contact between the two sections and which will release the bird section from the motor section simultaneously throughout the entire 360° of contact area within a few micro-seconds.

Another object of the invention is to provide a mechanical clamp to hold the bird section of a missile in sealing relationship with the motor section of the missile which may be applied without special tools or knowledge and which may be completely released through an explosive medium.

A further object of the invention is the provision of means which, when clamping the two sections together, will move one section longitudinally with respect to the other to insure cooperation between tapered surfaces of the two sections to provide a seal.

Other objects and many of the attendant advantages of this invention will be readily appreciated as the same becomes better understood by reference to the following detailed description when considered in connection with the accompanying drawings wherein:

FIG. 2 is a longitudinal section of that part of the missile showing the connection between the bird section and the motor section;

FIG. 3 in a cross-section of the missile taken on line 3—3 of FIG. 2; and

Figure 1:
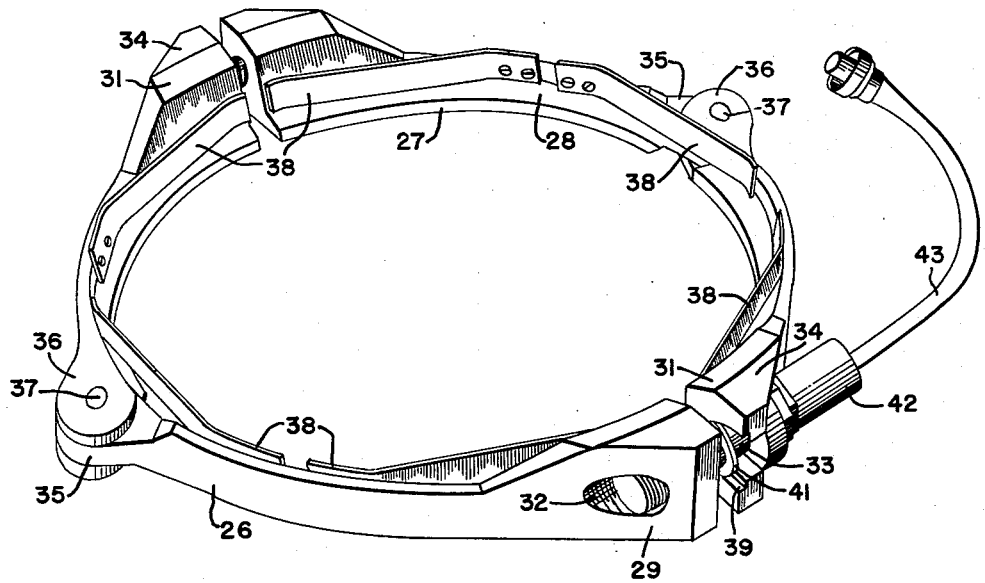
FIG. 1 is a perspective view of the clamp.
Figure 4:

FIG. 4 is a plan view of the missile.

Referring to the drawings in detail, wherein like parts are designated by like numerals throughout the several views, the complete missile shown in FIG. 4 consists of a bird section 8 and a motor section 9, with a cap 11 securely attached to the motor section and providing the connecting link between the bird section and the motor section. The bird section 8 has a plurality of stabilizing fins 12 located at its rear end, just forward of the cap 11.

The cap 11 is attached to the motor section 9 by bolts 10 [shown in dashed outline] which are recessed into the shoulder of the cap and threaded into the thickened portion 13 of the wall of the motor section. The cap fits over an upstanding annular rim 14 of the motor sections, and abuts against the thickened portion 13 of the motor section wall. The cap 11 is formed with a central opening 15, having an outwardly tapering wall 16.

The rear end of the bird section 8 is formed with an annular shoulder 18 and a reduced tapered portion 19 terminating in a rounded rim 21. The tapered portion 19 has an annular forward sealing groove 22 housing a sealing O-ring 23, which engages the tapered wall 16 of the cap opening 15 when the sections are assembled.

A second annular clamping groove 24, in the tapered portion 19 just forward of the rounded rim 21 is formed with a beveled rear wall 25. The distance between the shoulder 18 and the forward wall 20 of the clamping groove is less than the thickness of the cap at the opening 15.

The clamp securing the bird section to the motor section is formed of two identical semi-circular sections. Each of these sections is formed of a pair of 90° arcuate sections which are hingedly connected. The semi-circular apart by self-contained explosives.

The 90° arcuate sections forming a semi-circular section are composed of a band 26 formed with an inwardly projecting rim 27 having a beveled face 28. Each of the sections has enlarged ends 29 and 31 respectively, end 29 being bored and threaded at 32 to receive the threaded end of a bolt 33, while end 31 is formed with a yoke 34 receiving the head of bolt 33. The other ends of the 90° arcuate sections are formed respectively with an eye 35 and ears 36, which are fitted together and hingedly connected by pin 37. Fitted to the inside of band 26 are a plurality of leaf springs 38 which are secured at one end and extend as cords across the inner circumference of the band. Tightening of the band 26 in bird securing position causes the springs to assume the contour of the surface of the bird, placing them under stress.

The yoke 34 has a U-shaped shoulder 39 receiving a collar 41 formed on the bolt 33 which together with the head holds the bolt against longitudinal movement relative to the yoke. The bolt is hollow and receives, from the head end, an explosive fitting 42 having electrical connecting cord 43 attached thereto.

In the assembly of the bird section to the head section, the cap 11 is placed over the tapered end of the bird and the clamp fitted around the bird, the rim 27 entering the annular clamping groove 24, the beveled face 28 contacting the beveled rear wall 25 of the groove 24. Tightening of the bolts wedges the clamp into the groove and draws the bird section and cap together, until the shoulder 18 contacts the outer surface of the cap. With this contact the O-ring 23 is in sealing relation with the tapered wall of opening 15 and the bird firmly fixed to the cap. The cap is bolted to the motor section after connecting the cord 43 to a control circuit.

When the time for release of the bird is at hand the control circuit ignites the explosive bolts, rupturing said bolts and releasing the clamp. The springs 38, reacting against the outer surface of the bird section, cause the semi-circular sections to fly outward from the groove simultaneously throughout the 360° contact, releasing the bird from the motor section. The parts of the clamp have sufficient room within the cap to avoid any possible contact with the bird section during release, which separation is accomplished within a few micro-seconds.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The combination, in a missile, of bird section, a motor section cap and a clamp securing said bird section to said motor section clamp, said bird section having a tapered rear section formed with a sealing groove and a clamping groove, a sealing O-ring housed in the sealing groove, said clamping groove having a front annular wall substantially normal to the wall of the bird section and a beveled annular rear wall, said clamp having a beveled rim coacting with the beveled rear wall of the clamping groove when in clamping position, said motor section cap being formed with a central opening having a tapered wall to coact with the tapered rear section of the bird and with the sealing O-ring, said clamp engaging the inner wall of the cap and the beveled wall of the clamping groove to hold said bird section and said cap in sealing relationship, and explosive bolt means connected to each of adjacent ends of the clamp for securing the clamp in clamping position.

2. The combination, in a missile, of a bird section, a motor section cap and a clamp securing said bird section to said motor section cap, said bird section having a tapered rear section formed with a sealing groove and a clamping groove, a sealing O-ring housed in the sealing groove, said clamping groove having a front annular wall substantially normal to the wall of the bird section and a beveled annular rear wall, said clamp having a beveled rim coacting with the doubled rear wall of the clamping groove when in clamping position, said motor section cap being formed with a central opening having a tapered wall to coact with the tapered rear section of the bird and with the sealing O-ring, said clamp engaging the inner wall of the cap and the beveled wall of the clamping groove to hold said bird section and said cap in sealing relationship, said clamp comprising a pair of oppositely disposed semicircular members each of which comprises first and second sections pivotally connected together at adjacent ends to form the semicircular members, the adjacent ends of said pair of members being releasably connected together by explosive bolt means.

3. The combination as described in claim 2 further comprising flat spring means disposed between said clamp and the tapered rear section of the bird to resiliently bias the clamp in a direction away from said bird, whereby, upon detonation of the explosive bolt means, the clamp will release the bird simultaneously throughout the peripheral area of contact therebetween.

References Cited by the Examiner
UNITED STATES PATENTS

| | | | |
|---|---|---|---|
| 2,721,517 | 10/55 | Workman | 102—49 |
| 2,809,584 | 10/57 | Smith | 102—49 |
| 2,850,976 | 9/58 | Seifert | 102—49 |
| 2,945,704 | 7/60 | Korn | 102—49 |
| 2,981,187 | 4/61 | Riordan et al. | 102—49 |
| 3,115,836 | 12/63 | Brashears | 102—49 |
| 3,132,590 | 5/64 | Hall | 102—49 |

SAMUEL FEINBERG, *Primary Examiner.*

A. M. HORTON, *Examiner.*